United States Patent [19]

Knight et al.

[11] Patent Number: 5,793,584

[45] Date of Patent: Aug. 11, 1998

[54] DEVICE AND METHOD FOR ELECTROSTATICALLY CLEANING A DISK MOUNTED IN A REMOVABLE CARTRIDGE

[75] Inventors: Gordon R. Knight, Saratoga; Amit Jain, Sunnyvale; Brian Bonn, Scotts Valley, all of Calif.

[73] Assignee: TeraStor Corporation, San Jose, Calif.

[21] Appl. No.: 764,175

[22] Filed: Dec. 13, 1996

[51] Int. Cl.$^6$ ............................ G11B 23/03; G11B 23/50
[52] U.S. Cl. ...................... 360/133; 360/137; 369/291; 369/72; 15/1.51
[58] Field of Search ............................. 360/133, 137, 360/128; 369/72, 291; 15/1.51

[56] References Cited

U.S. PATENT DOCUMENTS

| | | | |
|---|---|---|---|
| 1,455,504 | 5/1923 | Odem | 369/72 |
| 3,609,721 | 9/1971 | Meneley | 360/78.04 |
| 3,897,069 | 7/1975 | Lee | 369/72 |
| 4,101,948 | 7/1978 | Tadokoro et al. | 360/137 |
| 4,435,798 | 3/1984 | Taub | 369/72 |

(List continued on next page.)

FOREIGN PATENT DOCUMENTS

| | | |
|---|---|---|
| 62-31080 | 2/1987 | Japan. |
| 62-204421 | 9/1987 | Japan. |
| 01-161308 | 6/1989 | Japan. |

OTHER PUBLICATIONS

Betzig, E., et al., "Near–field magneto–optics and high density data storage", *Appl. Phys. Lett.*, vol. 61, No. 2, pp. 142–144, Jul. 13, 1992.

Maeda, F., et al., "High density optical disk system using a new two–element lens and a thin substrate disk", *Technical Digest, 1996 International Symposium on Optical Memory and Optical Data Storage*, pp. 342–344, 1996.

Mansfield, S., et al., "High–numerical–aperature lens system for optical storage", *Optical Letters*, vol. 18, No. 4, pp. 305–307, Feb. 15, 1993.

Mansfield, S., et al., "Solid immersion microscope", *Appl. Phys. Lett.*, vol. 57, No. 24, pp. 2615–2616, Dec. 10, 1990.

Yamamoto, K., et al., "A 0.8 Numerical Aperture Two Element Objective Lens for the Optical Disk", *Technical Digest 1996 International Symposium on Optical Memory and Optical Data Storage*, pp. 345–347, 1996.

G.S. Kino, "High Density Storage with a Solid Immersion Lens", *Ginzton laboratory, Stanford University*, 1994.

Hayashi, S., et al., "Solid Immersion Lens for Optical Storage," Stanford University, G.L. Report No. 5258, Feb. 1995 (9 page document).

Ichimura, Isao, et al., "High Density Optical Recording Using a Solid Immersion lens,"Stanford University, G.L. Report No. 5371, Nov. 1995, pp. 1–22 and Figs. 1–17.

Mamin, H.J., et al., "High density optical recording with a flying solid immersion Lens," presented at the Optical Data Storage Conference in San Diego, California in May, 1995, pp. 1–2.

Terris, B.D., et al., "Near–field optical data storage using a solid immersion lens," *Applied Physics Letters*, 65 (4), Jul. 25, 1994, pp. 388–390.

Rubin, Kurt A., et al., "Volumetric Magneto–Optic Storage on Multiple Recording Surfaces", Jul. 8–12, 1996, *Technical Digest*, 1996, vol. 12.

Kashiwagi, Toshiyuki, "Dual Layer Disk Overview", *Technical Digest*, Jul. 8–12, 1996, vol. 12.

Rubin, Kurt A., et al., "Multilevel Volumetric Optical Storage", SPIE vol. 2338 *Optical Data Storage* 1994, pp. 247–253.

*Primary Examiner*—Craig A. Renner
*Attorney, Agent, or Firm*—Fish & Richardson P.C.

[57] ABSTRACT

A disk cartridge assembly includes an enclosure, a recording disk mounted for rotation in the enclosure, and an electrostatic cleaning element positioned on an interior surface of the enclosure. The cleaning element engages one side of the disk at least when the disk is at rest and when the disk is rotated at a low speed, and the cleaning element is charged to a high voltage.

7 Claims, 5 Drawing Sheets

U.S. PATENT DOCUMENTS

| | | | |
|---|---|---|---|
| 4,488,190 | 12/1984 | Oishi et al. | 360/133 |
| 4,519,059 | 5/1985 | Denis | 369/74 |
| 4,622,618 | 11/1986 | Oishi et al. | 360/133 |
| 4,633,450 | 12/1986 | Gueugnon | 369/13 |
| 4,661,874 | 4/1987 | Buehl et al. | 360/128 |
| 4,753,521 | 6/1988 | Deserno | 350/456 |
| 4,794,586 | 12/1988 | Korth | 369/215 |
| 4,965,780 | 10/1990 | Lee et al. | 369/13 |
| 4,987,292 | 1/1991 | Howard | 250/201.5 |
| 5,004,307 | 4/1991 | Kino et al. | 350/1.2 |
| 5,020,040 | 5/1991 | Lee | 369/13 |
| 5,041,923 | 8/1991 | Iwata et al. | 360/133 |
| 5,105,408 | 4/1992 | Lee et al. | 369/44.15 |
| 5,112,662 | 5/1992 | Ng | 428/64 |
| 5,115,363 | 5/1992 | Khan et al. | 360/104 |
| 5,120,603 | 6/1992 | Schmidt | 428/336 |
| 5,121,256 | 6/1992 | Corle et al. | 359/664 |
| 5,125,750 | 6/1992 | Corle et al. | 359/819 |
| 5,128,216 | 7/1992 | Ng | 428/695 |
| 5,136,448 | 8/1992 | Kiriyama et al. | 360/128 |
| 5,153,870 | 10/1992 | Lee et al. | 369/111 |
| 5,161,134 | 11/1992 | Lee | 369/13 |
| 5,182,444 | 1/1993 | Howard | 250/201.5 |
| 5,191,563 | 3/1993 | Lee et al. | 369/3 |
| 5,197,050 | 3/1993 | Murakami et al. | 369/13 |
| 5,202,880 | 4/1993 | Lee et al. | 369/275.4 |
| 5,223,710 | 6/1993 | Pavlak | 250/230 |
| 5,228,022 | 7/1993 | Compton et al. | 369/72 |
| 5,232,570 | 8/1993 | Haines et al. | 204/192.16 |
| 5,243,241 | 9/1993 | Wang | 310/36 |
| 5,247,510 | 9/1993 | Lee et al. | 369/118 |
| 5,255,260 | 10/1993 | Yamada et al. | 369/199 |
| 5,260,928 | 11/1993 | Lee et al. | 369/112 |
| 5,278,717 | 1/1994 | Sasaki et al. | 360/133 |
| 5,288,997 | 2/1994 | Betzig et al. | 250/227.26 |
| 5,295,122 | 3/1994 | Murakami et al. | 369/13 |
| 5,307,336 | 4/1994 | Lee et al. | 369/112 |
| 5,381,402 | 1/1995 | Lee et al. | 369/291 |
| 5,432,763 | 7/1995 | Campbell et al. | 369/44.19 |
| 5,445,011 | 8/1995 | Ghislain et al. | 73/105 |
| 5,452,283 | 9/1995 | Lee et al. | 369/112 |
| 5,467,238 | 11/1995 | Lee et al. | 360/128 |
| 5,470,627 | 11/1995 | Lee et al. | 428/64.4 |
| 5,481,420 | 1/1996 | Cardona et al. | 369/291 |
| 5,486,970 | 1/1996 | Lee et al. | 360/128 |
| 5,497,359 | 3/1996 | Mamin et al. | 369/44.15 |
| 5,504,731 | 4/1996 | Lee et al. | 369/112 |
| 5,541,888 | 7/1996 | Russell | 350/456 |
| 5,602,819 | 2/1997 | Inagaki et al. | 369/99 |
| 5,602,820 | 2/1997 | Wickramasinghe et al. | 369/126 |

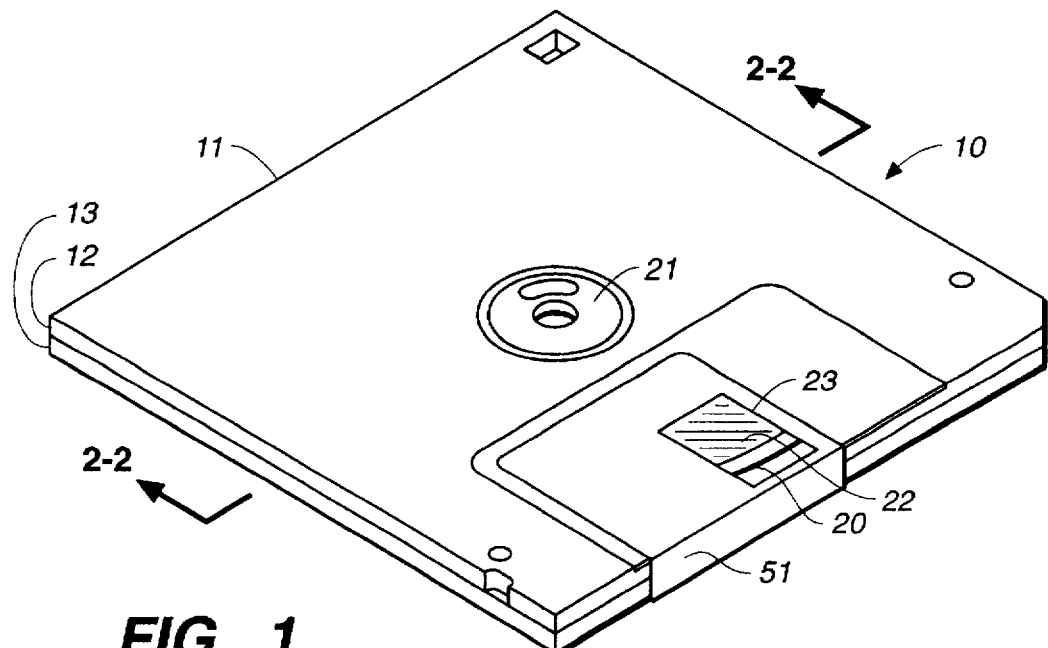
FIG._1
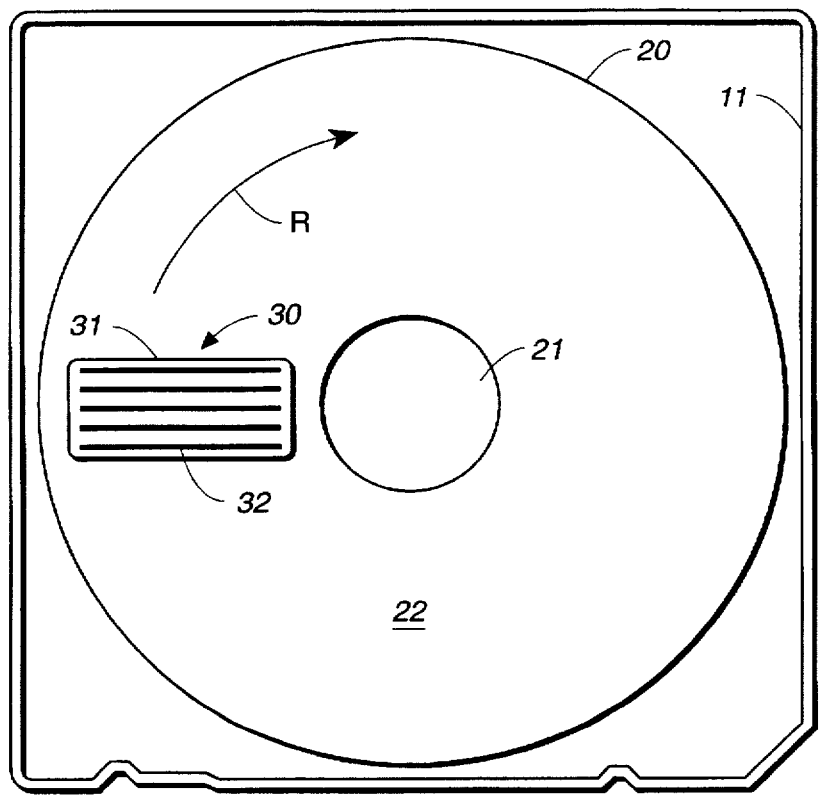
FIG._3

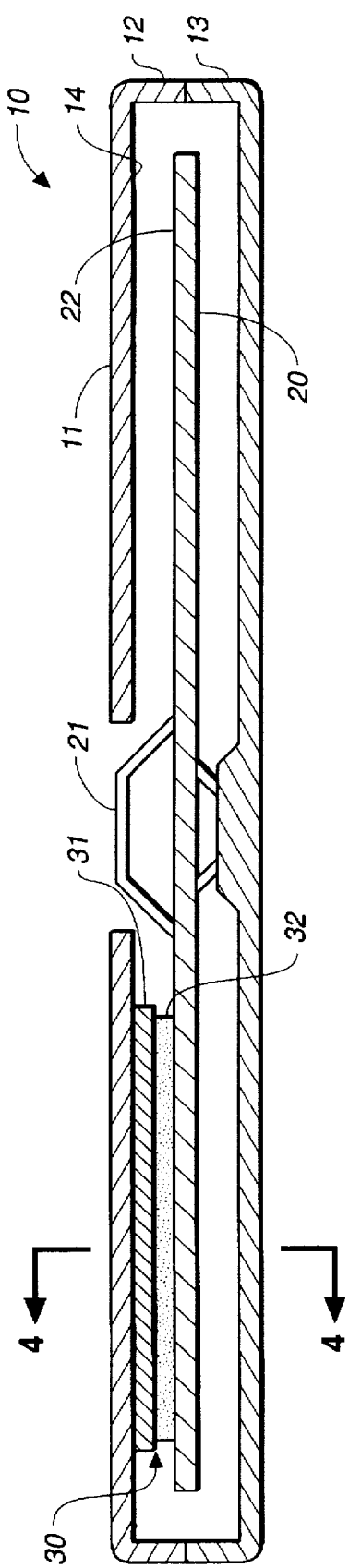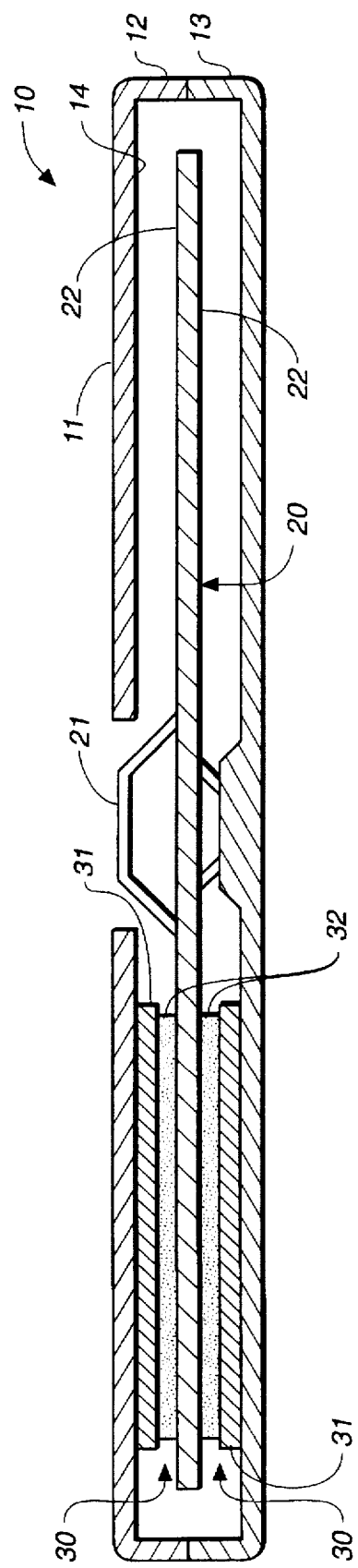

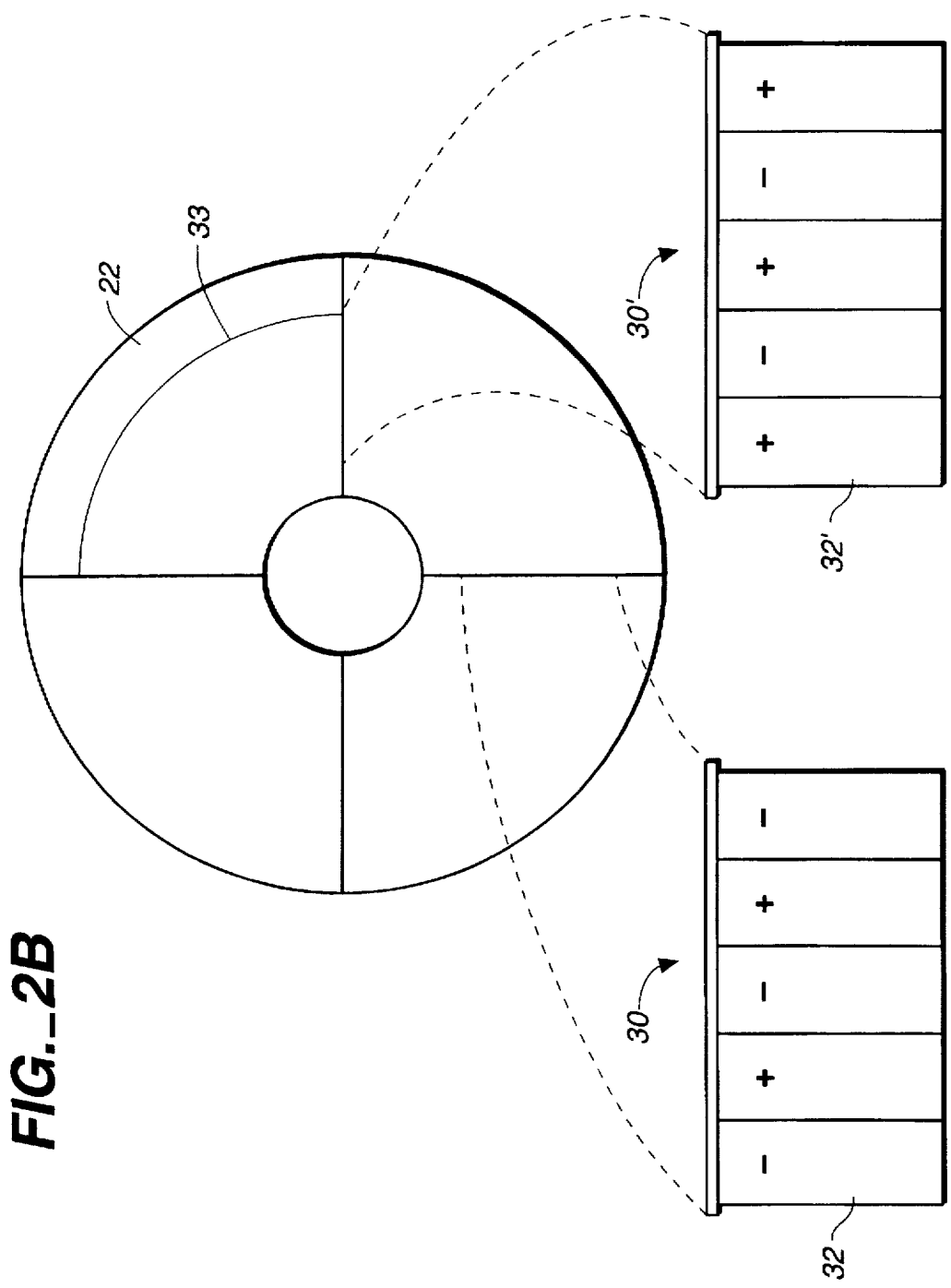
FIG._2B

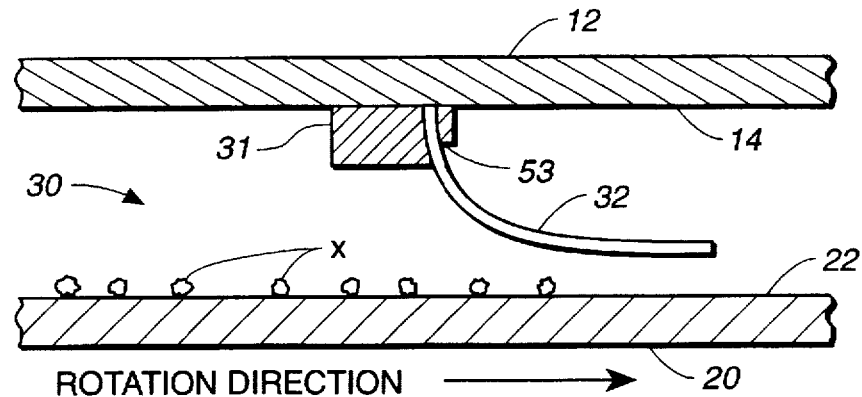
FIG._4
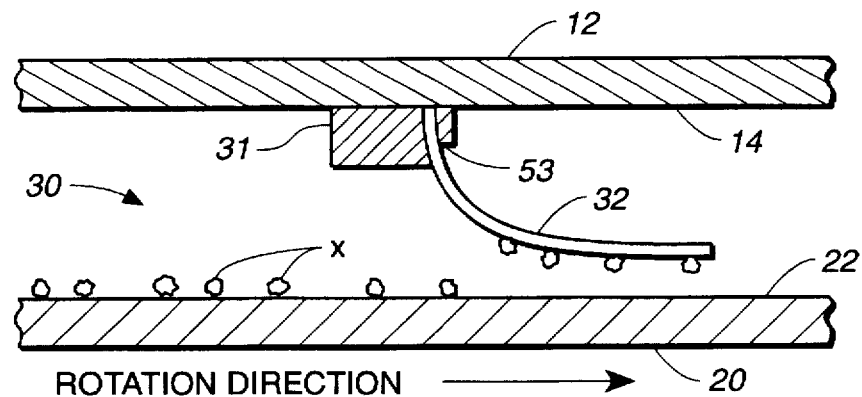
FIG._5
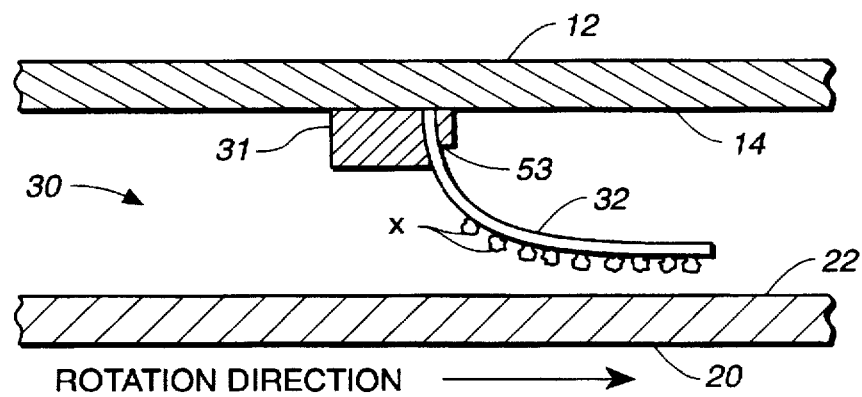
FIG._6

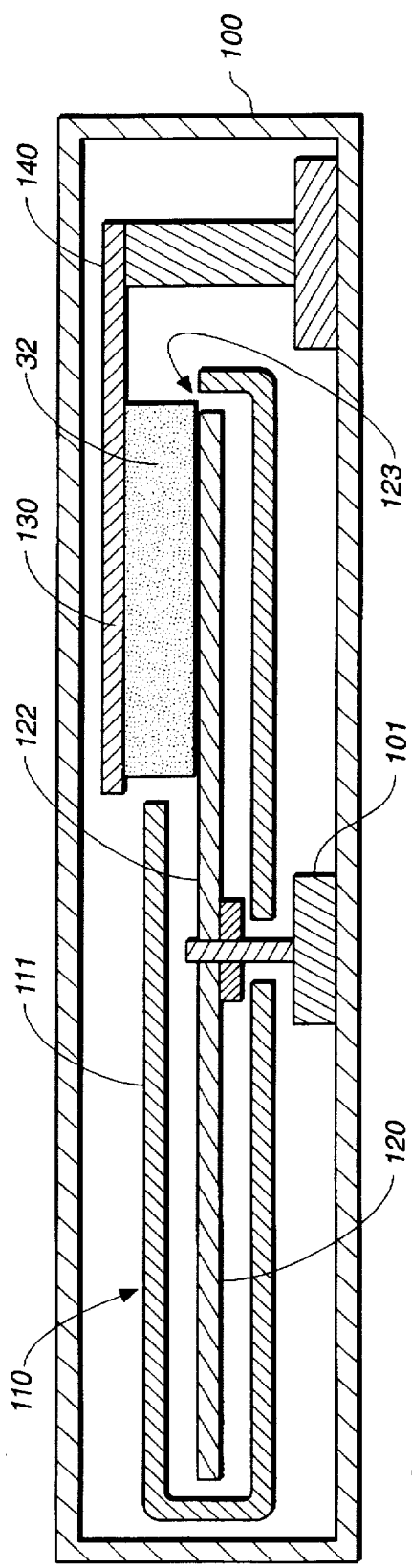
FIG._8
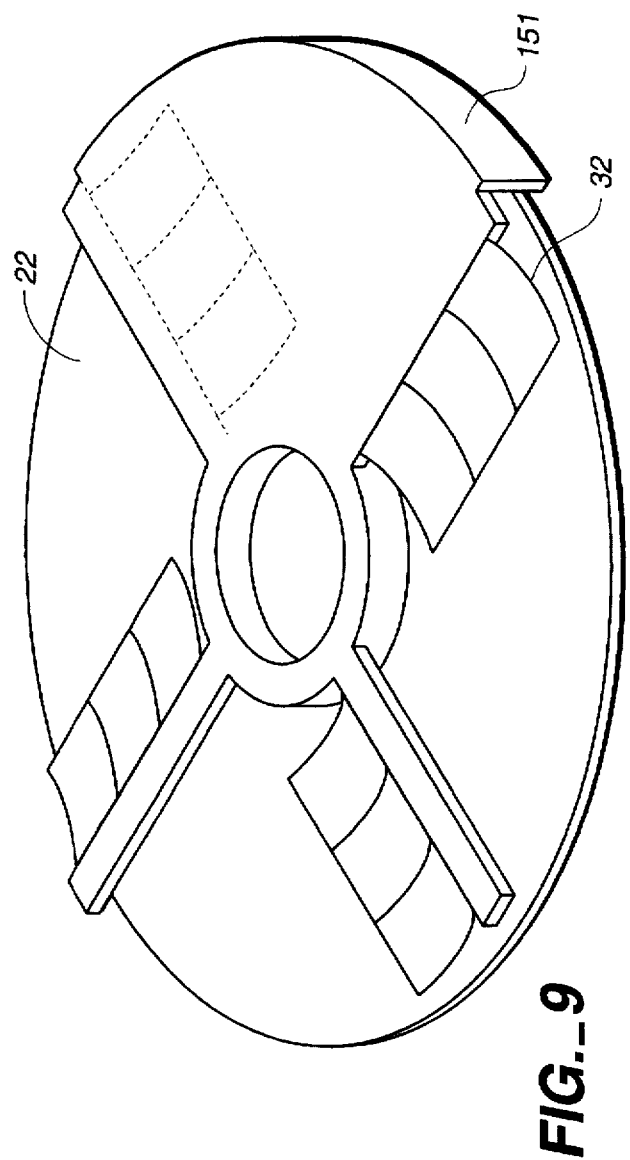
FIG._9

DEVICE AND METHOD FOR ELECTROSTATICALLY CLEANING A DISK MOUNTED IN A REMOVABLE CARTRIDGE

FIELD OF THE INVENTION

This invention relates generally to devices and methods for cleaning disks, and more particularly to a device and method of electrostatically cleaning a recording disk enclosed in a removable cartridge.

BACKGROUND OF THE INVENTION

It is known that the surface of a disk used for storing recorded information must be adequately cleaned to faithfully reproduce the recorded information. Cleaning also helps to prevent damage to the components used to access the information, such as read/write heads.

Recent advances in electronic, magnetic, and optical technologies have resulted in disks storing information at very high recording densities. In order to achieve such high recording densities, modern disks use air-bearing read/write heads which "fly" above the recording surface at a minimum clearance. It is not unusual for the clearance between the read/write head and the disk surface to be less than the diameter of air-born dust particles.

Dust particles caught between the head and the surface of the disk can interfere with the flying of the head, causing catastrophic head crashes, and making the disk unfit for its intended purpose. Also the accumulation of dust particles on the surface of the disk or the transducer of the read/write head can attenuate the signals used to read the information. This may produce erroneous information.

It is also known that most, if not all, dust particles contain a static electric charge. This charge may be either positive or negative. These charged dust particles tend to be attracted to and stick to a disk surface, especially a plastic disk. It is further known that common cleaning methods using cloth, fibers or brushes are not very effective in cleaning this charged dust material off the disk surface, as dust clings to the surface due to its electrostatic charge.

Known techniques for minimizing dust generally include mechanical techniques such as brushing dust away with fibers or enclosing disks in cartridges. In a cartridge system, the removable cartridge usually includes a spring-loaded access door, which should only be opened by the system when accessing the information recorded on the disk. However, a cartridge that is of reasonable cost is not generally dust-proof. Dust may enter the cartridge in numerous ways, for example, during transportation, as removable media are readily transportable. Disks may be stuffed into people's lint-filled pockets, and the access door may be opened accidentally to admit hazardous dust.

Cleaning mechanisms made of a flexible material have been designed for removable disks generally in constant contact with the disk surface. However, these mechanisms are not readily applicable to rigid disks rotating at a high speed, where they would cause wear and tear on both the disk and the cleaning mechanism itself.

Accordingly, it is an object of the present invention to provide a disk cleaning device and method that uses electrostatic forces to attract dust particles from the disk surface. It is a further object to provide an electrostatic cleaning device and method in which attraction is provided for dust particles of both positive and negative polarity. It is yet a further object to provide a disk cleaning device and method in which the cleaning material does not degrade the disk surface.

SUMMARY OF THE INVENTION

In one embodiment, the invention is directed to a disk cartridge assembly including an enclosure, a recording disk mounted for rotation in the enclosure, and an electrostatic cleaning element positioned on an interior surface of the enclosure. The cleaning element engages one side of the disk at least when the disk is at rest and when the disk is rotated at a low speed, and the cleaning element is charged to a voltage of at least 100 volts.

Implementations of the invention include the following. The cleaning element is disengaged from the disk by air currents when the disk is rotated at operating speed. The cleaning element includes a thin flexible tape. The tape is mechanically coupled to a sector door of the cartridge. The disk includes a second cleaning element positioned on the interior surface of the enclosure for engaging with an opposing side of the disk at least when the disk is at rest and when the disk is rotated at a low speed. The disk is rigid. The cleaning element is in contact with the recording disk.

In another embodiment, the invention is directed to a disk cartridge assembly including an enclosure, a recording disk mounted for rotation in the enclosure, and at least two electrostatic cleaning elements positioned on an interior surface of the enclosure, the cleaning elements disposed along different radii of the disk. Along any given disk radial sector intersecting the cleaning elements, the charge on one of the two cleaning elements has a polarity opposite to the polarity of the charge on the other of the two cleaning elements.

In another embodiment, the invention is directed to a disk cartridge assembly including an enclosure, a recording disk mounted for rotation in the enclosure, an electrostatic cleaning element positioned on an interior surface of the enclosure including a tape for engagement with a surface of the disk, and ribs for urging the tape to engage with the disk when the disk is at rest and when the disk is rotating at a low speed. The ribs urge the tape to engage with the disk with a predetermined force sufficient to attract dust particles but insufficient to degrade the disk.

In a further embodiment, the invention is directed to a disk cartridge assembly including an enclosure, a recording disk mounted for rotation in the enclosure, and an electrostatic cleaning element positioned on an interior surface of the enclosure. The cleaning element engages with the disk at least when the disk is at rest and when the disk is rotated at a low speed, and the cleaning element includes a hydrophobic polymer.

In another embodiment, the invention is directed towards a disk drive assembly including a removable disk cartridge having an enclosure for a rotatably mounted rigid disk and an access hole for accessing the disk, a disk bay for receiving the cartridge, the disk bay including a spindle for rotating the disk, and a cleaning element positioned in the mounting bay for engaging with the disk through the access hole at least when the disk is at rest and when the disk is rotating at a low speed, the cleaning element charged to a voltage of at least 100 volts.

In another embodiment, the invention is directed towards a method for cleaning a recording disk of a disk cartridge assembly including the steps of charging an electrostatic cleaning element to a voltage of at least 100 volts, mounting a recording disk for rotation in an enclosure, positioning the electrostatic cleaning element on an interior surface of the enclosure, and engaging the cleaning element with the disk at least when the disk is stationary and when the disk is rotated at a low speed.

It is an advantage of the invention that dust particles having either positive and negative polarity may be cleaned from a disk surface. It is a further advantage that the cleaning material does not degrade the disk surface.

BRIEF DESCRIPTION OF THE DRAWINGS

The accompanying drawings, which are incorporated in and constitute a part of the specification, schematically illustrate the invention and, together with the general description given above and the detailed description given below, serve to explain the principles of the invention.

FIG. 1 is a perspective view of a removable disk cartridge enclosing a recording disk;

FIG. 2(a) is a cross-sectional view of the disk cartridge of FIG. 1 taken along line 2—2;

FIG. 2(b) is a top view of a disk which may be used with the present invention, as well as close-up plan views of two cleaning elements according to an embodiment of the present invention;

FIG. 3 is a plan view of the interior of the disk cartridge;

FIGS. 4, 5, and 6 are side views of a cleaning element taken along line 4—4 of FIG. 2(a), each corresponding to different disk spin velocities;

FIG. 7 shows an alternative embodiment of the invention;

FIG. 8 shows the cleaning element mounted in a disk drive;

FIG. 9 shows an alternative embodiment in which the cleaning elements are mounted on a sector door.

DETAILED DESCRIPTION

FIG. 1 shows a disk cartridge assembly 10 including a rotatable disk 20. In the embodiment of FIG. 1, access to the disk is shown via a sliding door S1 for a linear actuator. Similarly, a rotary actuator can also be used. In the latter case, the door opens not linearly, but rather along a radial sector of the disk 20. The disk 20 is generally rotated by a conventional motor driven spindle, not shown, engaging with a hub 21 attached at the center of the disk 20.

The disk 20 is contained within a enclosure 11 having a top cover 12 and an opposing bottom cover 13. The disk 20 includes at least one surface 22 for storing recorded information. The information on the disk 20 can be read or written by conventional optical or magnetic signals.

The assembly 10 includes the sliding door S1 to permit access to the disk 20 via an access hole 23 in the enclosure 11. The disk cartridge assembly 10 is externally configured to conform with, for example, industry standard "3½ inch" disk drive dimensions. It should be apparent that the invention can be used with disk cartridges conforming to other dimensions. The assembly 10 is characterized as having a very thin profile, generally less than 1.0 cm in total thickness.

At higher recording densities, it is important that the recording surface 22 be kept clean to permit the recording and retrieval of information. Also, unless the disk 20 is cleaned adequately, dust particles are likely to damage the read/write head, not shown, used to access the information on the disk 20.

Therefore, as shown in FIG. 2(a), the assembly 10 is provided with a cleaning element 30 which electrostatically attracts dust off the recording surface 22 of the disk 20.

According to a preferred embodiment of the invention, the cleaning element 30 is mounted on an interior surface 14 of the enclosure 11 facing the recording surface 22. The cleaning element 30 includes a base 31 with one end of a lightweight flexible tape 32 fixed thereon. The tape 32 is made, for example, of a long-wearing, flexible electret polymer material, approximately 1 mil thick, capable of holding a high electric charge for a long period of time.

The tape 32 is arranged as one or more flexible planar curtains of tape that extend between a base 31 and the disk surface 22. As FIG. 2(a) is a side view, only one curtain of tape is visible. It may be useful, although not necessary, to have the curtains of tape extend along radii of the disk 20. The material of tape 32 contains a static charge that may be generally larger than that of the magnetic media. In this way, dust is forced off the disk surface onto the highly charged cleaning material. This dust sticks to the cleaning material surface and cannot generally return to the disk by air currents or gravity.

Good examples of the cleaning material of tape 32 are electret materials. These are dielectric bodies with separate electric poles of opposite polarity. Such materials are stable and are typically provided as a highly charged thin plastic film such as Mylar® or Teflon®. When such a plastic film is properly charged (such as with over 100 or even 1,000 volts) the film can retain an adequate charge for tens of years. The voltage and charge level chosen generally depend upon the type of media, the expected lifetime of the media, its electrical environment and the type of dust generally encountered. In normal situations, a high voltage is preferable to a low voltage. However, a high voltage may lead to tape sticking. The charge level chosen should be high enough to strongly attract charged dust particles from the disk but not so high that sticking effects are caused.

Preferably the plastic film is a hydrophobic polymer, for example, Teflon® or polystyrene. These films maintain their charge even in a humid environment.

Tape 32 may also be self-charging. One way of doing this is to construct the tape of two materials that, when rubbed together, generate equal and opposite charges between them. To increase the surface area available for such rubbing, the tape may be made of strands or fibers. One type of such tape that may be used is manufactured by 3M of Minneapolis, Minn., under the trademark "Duster Doodle".

The charged sections may be located on a single side of the tape. The charged side faces generally towards disk surface 22 as the disk rotates underneath. Tapes 32 and 32' are sufficiently long such that a portion drags along the disk surface 22. This provides for a greater contact surface area between the tape and the disk surface 22, resulting in enhanced cleaning efficiency because the cumulative electrostatic forces are much larger.

The base 31 on which the tape 32 is mounted is a generally rectangular backing strip mounted on any of the interior surfaces 14 of enclosure 11 facing recording surface 22 to be cleaned. The length of the base 31 may be made to conform to the radial dimension of the recording surface 22 of the disk 20. Alternatively, base 31 can be molded as an integral part of enclosure 11.

One way of implementing the invention is shown in FIG. 2(b). In this embodiment, disk surface 22 engages four separate cleaning elements, two of which are shown in plan view close-ups as first cleaning element 30 having first tape 32 and second cleaning element 30' having second tape 32'. Each tape has alternating sections of positively and negatively oriented electret material so that, as disk 20 rotates underneath, the sections attract negatively and positively charged dust particles, respectively.

First tape 32 and second tape 32' may be charged such that, along any one radial sector 33 of disk surface 22, first tape 32 has a charge opposite that of second tape 32'. Thus, no matter the polarity or net charge of the dust particle on disk surface 22, or where on disk surface 22 the particle is located, either first tape 32 or second tape 32' will provide an attractive force to remove it. In a separate embodiment, the entirety of first tape 32 may have a single charge and the entirety of second tape 32' may have the opposite charge. In the below discussion, for clarity, a single tape 32 will be described. However, these examples are fully applicable and are intended to encompass a system with two or more tapes.

FIG. 3 shows, in another embodiment, the relative positions of enclosure 11, disk 20, and cleaning element 30. In this embodiment, tape 32 is composed of several parallel strips of electret material which engage with recording surface 22 of disk 20.

In this embodiment, the tapes contact the disk when it is at rest. Upon disk start-up (at low rpm), the tapes continue to touch and clean the disk surface by attracting the charged dust off the disk. At higher rpm, such as during normal disk drive operation, the air flow raises the tapes off the disk surface. Reference character "R" is shown to indicate the direction of rotation.

FIG. 4 shows cleaning element 30 when the disk is not rotating. Dust particles are generally indicated by an "X". One end of tape 32 engages with surface 22 of disk 20 to be cleaned. Base 31 may include a plurality of ribs S3 for urging the end of tape 32 to engage with disk 20 when at rest. However, these ribs are generally not necessary. A gentle angling of tape 32 is often sufficient.

With a gentle angling, tape 32 does not provide such a downward force that disk surface 22 is actually degraded or abraded. In fact, the connection of tape 32 to base 31 may be designed specifically to provide just the amount of pressure needed to attract dust particles, but not so much as to degrade the disk surface or its lubrication. Factors considered in such design include the charge on tape 32, the charge on the dust particles, and the distance to which the above charges must be brought to cause the electrostatic attraction between the tape and the dust particles to overcome the electrostatic attraction between the dust particles and disk surface 22. The latter attraction may arise from, for example, gravity, surface charge, surface tension, and electrostatic attraction.

FIG. 5 shows cleaning element 30 when disk 20 is rotated at a low speed. Tape 32 is still in close contact with surface 22 of disk 20, and as disk 20 rotates, dust particles X are attracted off recording surface 22 by tape 32. Static charges stored in tape 32 capture and retain dust particles X on tape 32 to maintain a clean recording surface 22.

FIG. 6 shows assembly 10 when disk 20 is rotating at high speed during normal operation when the information on recording surface 22 is being accessed. The movement of air, due to the rapid rotation of disk 20, causes one end of tape 32 to disengage from recording surface 22. This may occur when the disk is rotating at a small percentage of its rated operating speed, for example, at 20%–30% of the rated operating speed. The electrostatic charge on tape 32 retains dust particles X on tape 32.

FIG. 7 shows another embodiment of the invention for use with a double-sided disk 20 having two recording surfaces 22. Assembly 10 of FIG. 7 is configured with two cleaning elements 30, one mounted on the interior surface 14 of the top and bottom covers 12 and 13 to permit the cleaning of disk 20.

FIG. 8 shows another embodiment of the invention including disk cartridge 110 removably mounted inside mounting bay 100 of a disk drive. In this embodiment, the cleaning elements are mounted in the drive bay rather than in the interior of the disk cartridge. Disk cartridge 110 includes an enclosure 111 having an access hole 123. Disk 120 is mounted inside enclosure 111. Disk 120 is engaged for rotation with spindle 101. Cleaning element 130 is mounted at a free end of arm 140. Arm 140 can be pivotally or linearly mounted in mounting bay 100. Cleaning element 130 engages with a surface 122 of disk 120 through access hole 123 of enclosure 111 when cartridge 110 is inserted in mounting bay 100. Cleaning element 130 includes, as previously described, tape 132 for removing dust from surface 122 of disk 120.

FIG. 9 shows another embodiment of the present invention. In this embodiment, at least two tapes 32 are rotatably mounted to sector door 151 of disk 22. When sector door 151 is circumferentially displaced to expose a portion of disk 22, tapes 32 are circumferentially displaced because they are connected to and move with sector door 151. As they are displaced, they clean disk surface 22. In general, the number of tapes needed in this embodiment is related to the angular distance that sector door 151 moves. For example, if sector door 151 moves ninety degrees, eight tapes may be used (each quadrant of ninety degrees is swept by two tapes—one of each polarity). A one-way gear with a cam mechanism may be provided so that, upon the closing of door 151, tapes 32 are not forced along disk surface 22 in reverse and perhaps an undesired manner. The mechanism may also function to pull the tape off the media prior to the spinning of the media up to operational speed.

The present invention has been described in terms of several preferred embodiments. The invention, however, is not limited to the embodiments depicted and described. Rather, the scope of the invention is defined by the appended claims.

What is claimed is:

1. A disk cartridge assembly comprising:

an enclosure;

a recording disk mounted for rotation in the enclosure; and at least two electrostatic cleaning elements positioned on an interior surface of the enclosure, the electrostatic cleaning elements having voltages of opposite polarity, the cleaning elements engaging one side of the disk at least when the disk is at rest and when the disk is rotated at a low speed, and the cleaning elements charged to a voltage magnitude of at least 100 volts but less than a voltage magnitude at which the cleaning elements stick to each other or to the disk.

2. The assembly of claim 1 wherein the two cleaning elements are disengaged from the disk by air currents when the disk is rotated at operating speed.

3. The assembly of claim 1 wherein the two cleaning elements each include a thin flexible tape.

4. The assembly of claim 3 wherein said enclosure includes a sector door, and each tape is mechanically coupled to said sector door.

5. The assembly of claim 1 wherein said electrostatic cleaning elements further comprise means for charging.

6. The assembly of claim 1 wherein the disk is rigid.

7. A method of cleaning a recording disk of a disk cartridge assembly comprising the steps of:

charging two electrostatic cleaning elements, each of opposite polarity, to voltages having magnitudes of at least 100 volts, but less than a voltage magnitude at which the cleaning elements stick to each other or to the disk;

mounting the recording disk for rotation in an enclosure;

positioning the electrostatic cleaning elements on an interior surface of the enclosure; and engaging the cleaning elements with the disk at least when the disk is stationary and when the disk is rotated at a low speed.

* * * * *